T. E. BRIDGER.
DENTAL APPARATUS.
APPLICATION FILED FEB. 8, 1907.
982,931.
Patented Jan. 31, 1911.
2 SHEETS—SHEET 2.
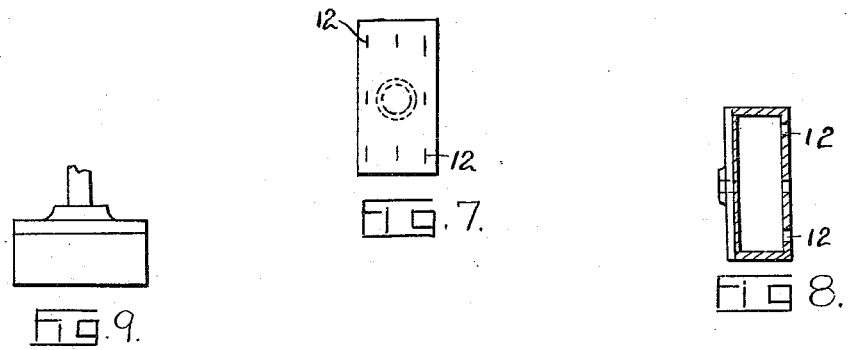
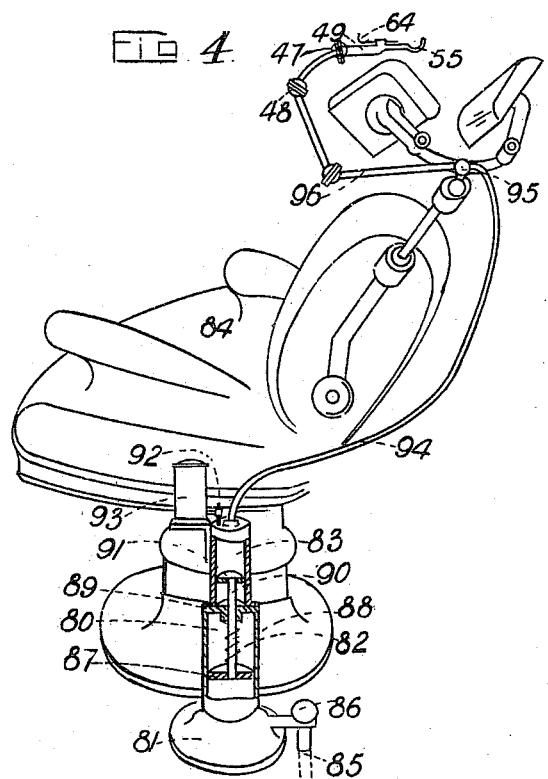
WITNESSES
Alvin J. White
W. P. Burke
INVENTOR
Theo. Eustace Bridger
BY McMillan White
ATTY

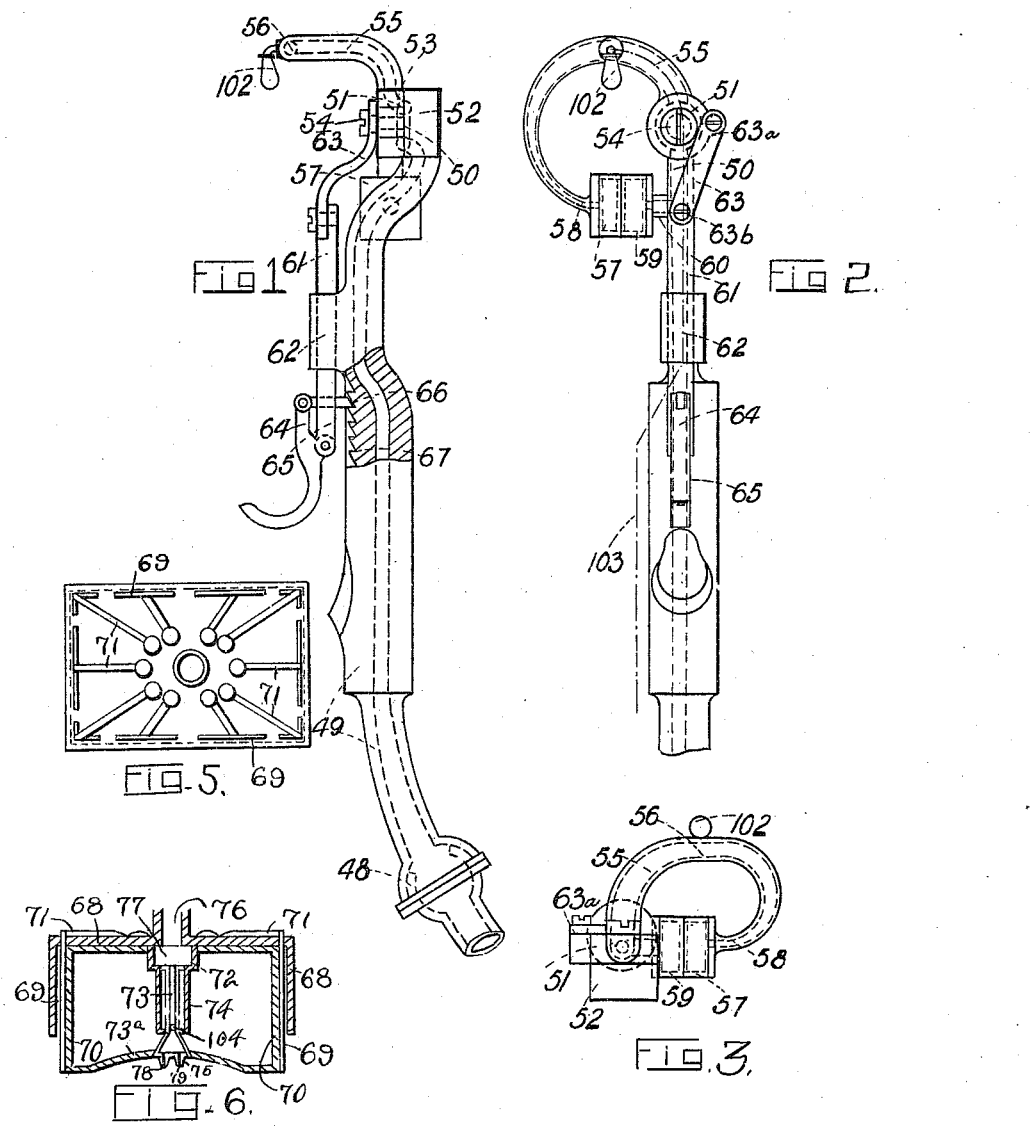

UNITED STATES PATENT OFFICE.

THEO EUSTACE BRIDGER, OF DUNEDIN, NEW ZEALAND.

DENTAL APPARATUS.

982,931.　　　　　Specification of Letters Patent.　　Patented Jan. 31, 1911.

Application filed February 8, 1907. Serial No. 356,343.

*To all whom it may concern:*

Be it known that I, THEO EUSTACE BRIDGER, of 5 Commercial Chambers, 24 Manse street, Dunedin, New Zealand, dentist, have invented certain new and useful Improvements in Dental Apparatus, of which the following is a specification.

The object of this invention is to render a tooth and the gum surrounding it insensitive to pain so that the tooth may be painlessly extracted by the usual forceps and so that operations on the tooth and gum may be performed painlessly, and in particular so that the grip of the forceps and the wrench of extraction are not felt and so that there are no unpleasant after effects. This object is effected by an apparatus which is operated to press slowly and steadily the blood away from the gums of the tooth by means of pads applied to them which pads also keep the gums from puffing, and are controllably supplied under pressure with an isotonic saline solution which is caused by the pressure to infiltrate into the gums through the pads and so drives the blood back from the tissues not affected by the pressure of the pads. In conjunction with this apparatus there is used an instrument for injecting through a needle the saline solution supplied under pressure into the gum, the extraction being effected by the usual forceps suitable for the tooth operated upon.

At present the operator injects solutions by hand pressure which necessitates considerable exertion and is awkward to perform, whereas by the apparatus embodying the invention the pressure is derived from a water main or other suitable source of power and the solution is infiltrated into the gums by such pressure by the operator merely opening a valve after placing the apparatus in position. The pipe conveying the solution is also jointed so that it may be bent around into any desired position for operating.

With this apparatus the patient does not require to sit for several minutes with the mouth open to allow a drug to have effect and the operation can be started immediately. The apparatus is applicable to several teeth by the use of more pads and a desired area of the gums may be acted upon by altering the size and shape of the pads. A solution of any suitable anesthetic may be used but there are after effects, and the saline solution is preferred mainly because of its cheapness and harmlessness to the patient and there being no need for consideration of the dosage.

The apparatus carrying the gum pads may be used without a separate needle injecting apparatus but the result is not so effective.

The invention consists of the features and combination and arrangement of parts hereinafter described and more particularly pointed out in the claims.

The invention is illustrated in the accompanying drawings in which the same numerals of reference refer to the same or similar parts.

Figure 1 is a side view of the apparatus. Fig. 2 is a plan view of the same. Fig. 3 is an end view of the same. Fig. 4 is a perspective view illustrating the general arrangement of the apparatus as used in conjunction with a dental chair. Fig. 5 is a plan view of the face of a gum pad with lacerating points. Fig. 6 is a sectional view of the same. Fig. 7 is a plan view of the face of a gum pad without lacerating points but having orifices (57) in the face. Fig. 8 is a sectional side view of the same. Fig. 9 is a side view of the same.

A compressor (81) Fig. 4 having two chambers (80) (83) is mounted convenient to a dental chair (84) a water pressure pipe (85) being led from a main to enter the chamber (80) of the compressor (81) through a two way valve (86) of well known construction, one aperture being to admit water under pressure and the other aperture being to allow the admitted water to run to waste. In this chamber (80) there is a plunger (87) which is adapted to slide up and down in it being carried by a rod (88) which passes through the partition (89) between the chamber (80) and the chamber (83). A spring (82) around the rod (88) serves to keep the plunger (87) normally at the lower end of the chamber (80). The upper end (90) of the rod (88) carries a plunger (91) adapted to move up and down the chamber (83). Connected with this chamber (83) by a pipe and tap or valve (92) is a reservoir (93) for a solution situated so that the solution may flow by gravity when the tap is opened into the chamber (83).

A flexible tube (94) leads from the top of the chamber (83) to a suitable support (95) on the dental chair (84). From this support a rigid tube (96) provided with ball joints (48) at intervals leads to the instrument (49) a valve of a suitable construction being placed at the junction of the tube 96 with the handle 49, said handle being constructed to act as a conduit through which the solution flows.

It will be seen that when some solution is allowed to flow into the chamber (83) and the water pressure is let into the chamber (80) the plunger (87) is forced upward and the solution is driven by the pressure along the pipes and tubes to the valve (47). When the operation is finished the water in the chamber (80) is run to waste by opening the valve (86) whereupon the spring (82) returns the plunger (87) to its normal position.

The arms of the instrument as drawn show how and where they lead the instrument, but special arms for the different positions of the teeth and also special pads may be constructed for different teeth by any workman conversant with dental appliances.

At the end of the instrument there is a swivel joint (50) so constructed as to permit the continuation of the flow of the solution. This joint consists of a circular disk (51) and a second circular disk (52) jointed at their faces (53) and secured by the screw (54). Attached to the disk (51) is a bracket (55) which is arched at (56) to form a bridge to clear the teeth when in operation. A rubber pad (57) secured to the end (58) of the bracket (55) is adapted to be inflated and there is an opposing pad (59) similarly constructed secured by a pipe connection (60) to the side of the apparatus. Means are provided for the purpose of effecting the opening and closing of the pads (57) and (59) which consist of a guide piece (61) having a bearing (62) and a connecting link (63) with one of its ends (63ª) pivotally secured to the disk (51) and its other end (63ᵇ) pivotally secured to the guide piece (61). A catch (64) is mounted on the end (65) of the guide piece (61) the piece (66) of the catch (64) engaging a rack (67) formed on the handle of the instrument (49) for the purpose of preventing the pads opening when the pressure forces the saline solution through the pads. A small electric lamp (102) may be attached to the bracket (56) connected to a wire (103).

Figs. 5 and 6 illustrate the form of gum pad which I prefer to use. A casing (68) supports a series of guide pieces (69) which surround the hollow rubber pad (70) and are held in position by means of the springs (71). Secured to the casing (68) on the inside is a valve piece (72) adapted to receive a tube (73) which is made to slide within the lower portion (74) of the valve piece (72) the lower end (75) of the tube (73) being spread out and secured to the rubber pad (70). The solution enters by the opening (76) and is distributed into the pad through the valve (72) and when the pad is full the pressure of the solution is exerted on the face (77) of the tube (73) forcing it downward and flattening the hollowed portion (73ª) of the face of the pad so that the hollow points (78) and (79) prick or lacerate the gum. The hole (104) is exposed when the tube (73) is forced downward and the solution enters the part (75) and is forced into the gum through the hollow points (78) and (79).

Having now described my invention, what I claim as new and desire to secure by Letters Patent is:—

1. A dental apparatus comprising a hollow arm, a hollow stationary pad carried by the arm and communicating with the interior thereof, a second hollow pad adapted to engage with the first pad, means for movably connecting said second pad with the arm, means for moving said second pad, and means for forcing a fluid through the hollow arm and pads.

2. A dental apparatus comprising an arm, a pad carried thereby, said arm having a curved portion movably secured thereto, a second pad carried by said curved portion and adapted to engage with the first pad, and means for moving said curved portion to engage and disengage the pads.

3. A dental apparatus comprising an upright arm, a stationary pad carried thereby, a curved portion movably secured to the upper end of said arm, means for moving said portion comprising a reciprocating member, means for holding said reciprocating member stationary, and a pad carried by the curved portion.

4. A dental apparatus comprising a hollow arm, a stationary hollow pad carried thereby and communicating with the interior thereof, a curved hollow portion movably connected to the upper end of said arm, a hollow pad carried by said movable portion, and means for forcing fluid through the hollow arm into the pads.

5. In a dental apparatus, a solution pressure supply tube, hollow gum pads at the end of said tube, hollow lacerating points on the face of said pads, and tubular connections between said points and said supply tube.

6. In a dental apparatus, in combination, gum pads, tubular arms carrying the gum pads, means for closing the gum pads together, a solution reservoir, a compression chamber, a pipe connection between the solution reservoir and compression chamber, and means for compressing the solution in the compression chamber so that the solution is delivered under pressure through the tubular arms to the gum pads.

In testimony whereof I have signed my name to this specification in the presence of two subscribing witnesses.

THEO EUSTACE BRIDGER.

Witnesses:
ANDREW JOHN PARK,
JOHN RUTHERFORD PARK.